(12) United States Patent
Sakurai et al.

(10) Patent No.: US 11,859,844 B2
(45) Date of Patent: Jan. 2, 2024

(54) AIR CONDITIONER MANAGEMENT DEVICE, AND AIR CONDITIONER MANAGEMENT SCREEN GENERATION METHOD

(71) Applicant: Toshiba Carrier Corporation, Kanagawa (JP)

(72) Inventors: Koichiro Sakurai, Shizuoka (JP); Hidemitsu Kawai, Shizuoka (JP)

(73) Assignee: Toshiba Carrier Corporation, Kanagawa (JP)

( * ) Notice: Subject to any disclaimer, the term of this patent is extended or adjusted under 35 U.S.C. 154(b) by 22 days.

(21) Appl. No.: 15/734,450

(22) PCT Filed: Jun. 13, 2018

(86) PCT No.: PCT/JP2018/022535
§ 371 (c)(1),
(2) Date: Dec. 2, 2020

(87) PCT Pub. No.: WO2019/239509
PCT Pub. Date: Dec. 19, 2019

(65) Prior Publication Data
US 2021/0172638 A1 Jun. 10, 2021

(51) Int. Cl.
*F24F 11/52* (2018.01)
*F24F 11/54* (2018.01)
*F24F 11/58* (2018.01)
*G05B 15/02* (2006.01)
*F24F 11/523* (2018.01)

(52) U.S. Cl.
CPC .............. *F24F 11/54* (2018.01); *F24F 11/52* (2018.01); *F24F 11/58* (2018.01); *G05B 15/02* (2013.01); *F24F 11/523* (2018.01)

(58) Field of Classification Search
USPC ........................................................ 700/276
See application file for complete search history.

(56) References Cited

U.S. PATENT DOCUMENTS

2003/0140637 A1 7/2003 Masui et al.
2006/0028777 A1 2/2006 Chung et al.
(Continued)

FOREIGN PATENT DOCUMENTS

EP 2535655 A1 * 12/2012 .............. F24F 11/30
JP H10-160229 A 6/1998
(Continued)

OTHER PUBLICATIONS

Mitsubishi Electric, "Air-conditioner Control System Centralized Controller AG-150A AG-150A-A" Instruction Book, accessed at: https://web.archive.org/web/20130501021307/https://www.mitsubishielectric.com.au/assets/LEG/WT05369X12.pdf. May 1, 2013. 101 Pgs., (Year: 2013).*
(Continued)

*Primary Examiner* — Emilio J Saavedra
(74) *Attorney, Agent, or Firm* — DLA Piper LLP (US)

(57) ABSTRACT

An air conditioner management device that has a plurality of air conditioners as management targets, includes: a displayed-information generation unit that, as for the plurality of air conditioners, generates display information on a summary screen including mode-specific working unit number information indicating the number of air conditioners currently in an ON state in each set working mode and mode-specific stopped unit number information indicating the number of air conditioners currently in an OFF state in each set working mode; and a display unit that displays the display information generated by the displayed-information generation unit.

5 Claims, 7 Drawing Sheets

(56) References Cited

U.S. PATENT DOCUMENTS

| | | | |
|---|---|---|---|
| 2011/0057044 A1 | 3/2011 | Nishino et al. | |
| 2014/0316583 A1 | 10/2014 | Ambriz et al. | |
| 2014/0380234 A1* | 12/2014 | Shim | G06F 3/04842 |
| | | | 715/781 |
| 2015/0051739 A1* | 2/2015 | Song | G05B 15/02 |
| | | | 700/276 |
| 2016/0210569 A1* | 7/2016 | Enck | G06Q 10/0637 |

FOREIGN PATENT DOCUMENTS

| | | |
|---|---|---|
| JP | 2003-294298 A | 10/2003 |
| JP | 2008-257633 A | 10/2008 |
| JP | 2010-255954 A | 11/2010 |
| JP | 2011-158105 A | 8/2011 |
| JP | 5127281 | 1/2013 |
| JP | 2018-066485 A | 4/2018 |
| WO | WO 2008-126864 A1 | 10/2008 |

OTHER PUBLICATIONS

International Search Report PCT/JP2018/022535 dated Aug. 21, 2018.
Written Opinion PCT/JP2018/022535 dated Aug. 21, 2018.
European Search Report PCT/JP2018/022535 dated May 21. 2021.
India Office Action in Application No. 202047055638, dated Oct. 1, 2021.

* cited by examiner

AIR CONDITIONER MANAGEMENT DEVICE, AND AIR CONDITIONER MANAGEMENT SCREEN GENERATION METHOD

CROSS REFERENCE TO RELATED APPLICATIONS

This application is a U.S. National Stage Application of International Application No. PCT/JP2018/022535 filed Jun. 13, 2018. The entirety of all the above-listed application is incorporated herein by reference.

TECHNICAL FIELD

Embodiments of the present invention relate to an air conditioner management device and an air conditioner management screen generation method.

BACKGROUND ART

Usually, a large number of pieces of equipment are installed in a large building such as a school, hospital, and office building, and a management system is constructed so that the equipment is centrally managed by a central management device. The central management device sequentially acquires and holds operating status information from the equipment.

In addition, the central management device is configured to be communicable with an equipment management device, which is an operation terminal for the manager of the equipment to manage the equipment, and the manager can use the operation terminal to check the working status of the equipment and perform operations.

CITATION LIST

Patent Literature

Patent Literature 1: JP 2010-255954 A

SUMMARY OF INVENTION

In recent years, as operation terminals for performing equipment management, terminals using a touch panel such as tablet terminals have been frequently used. In managing air conditioners in a building with a terminal, the touch panel presents a management screen in which icons corresponding to the air conditioners are arranged. These icons contain information that indicates the working status of the corresponding air conditioners. By looking at the management screen on which these icons are displayed, the manager can grasp the ON/OFF states and the currently set working modes of the air conditioners such as a cooling mode and a heating mode.

However, when there are many air conditioners to be managed, it is not possible to display all the icons on the touch panel of the terminal at the same time. Therefore, in order to grasp the working status of all the air conditioners in the building, the manager needs to view the display screen information while scrolling the screen, which is time-consuming.

The present invention has been made in view of the above circumstances. An object of the present invention is to provide an air conditioner management device that is capable of displaying a management screen allowing easy grasping of the working status of all air conditioners even when a large number of air conditioners are to be managed, and an air conditioner management screen generation method.

In order to achieve the above object, an air conditioner management device that has a plurality of air conditioners as management targets, includes: a displayed-information generation unit that, as for the plurality of air conditioners, generates display information on a summary screen including mode-specific working unit number information indicating the number of air conditioners currently in an ON state in each set working mode and mode-specific stopped unit number information indicating the number of air conditioners currently in an OFF state in each set working mode; and a display unit that displays the display information generated by the displayed-information generation unit.

DESCRIPTION OF EMBODIMENTS

\<Configuration of Air Conditioning System Using Air Conditioner Management Devices According to Embodiment\>

Figure 1:
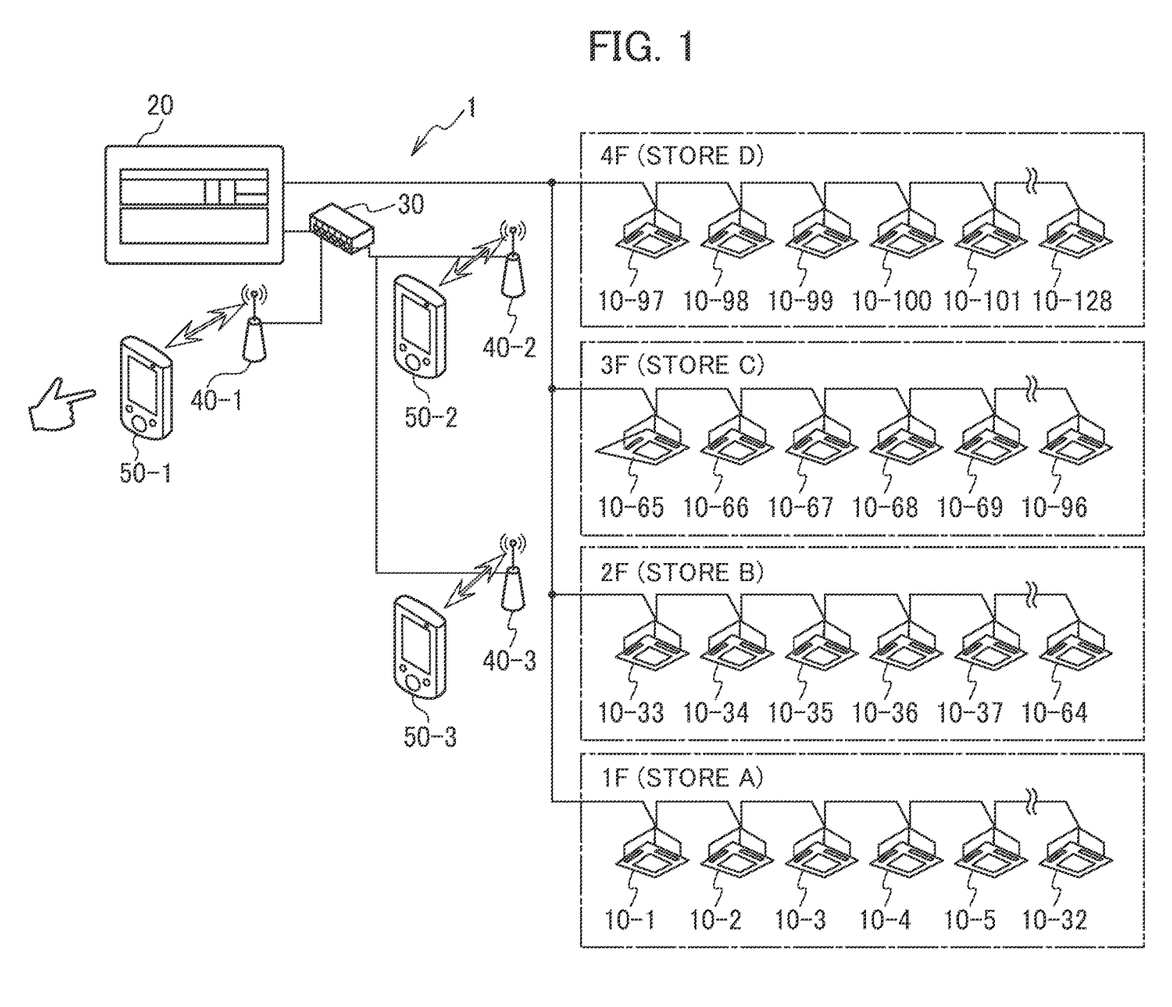
FIG. 1 is an overall view of an air conditioning system using tablet terminals, as an air conditioner management device according to an embodiment of the present invention.

As an embodiment of the present invention, a configuration of an air conditioning system using a tablet terminal as air conditioner management devices will be described with reference to FIG. 1. An air conditioning system 1 according to the present embodiment includes: 128 air conditioners to be managed (indoor equipment) 10-1 to 10-128 that are installed in a four-story building X; a controller 20 as a central management device that is connected to the air conditioners 10-1 to 10-128; wireless communication access points 40-1 to 40-3 that are connected to the controller 20 via a hub 30; a tablet terminal 50-1 that is wirelessly connected to the access point 40-1; a tablet terminal 50-2 that is wirelessly connected to the access point 40-2; and a tablet terminal 50-3 that is wirelessly connected to the access point 40-3. The tablet terminals 50-1 to 50-3 are operated by the manager of the air conditioning system 1. In the air conditioning system 1, the tablet terminals 50-1 to 50-3 correspond to air conditioner management devices. The number of tablet terminal used in the air conditioning system 1 may be one.

Store A is located on the first floor of the building X, and the air conditioners 10-1 to 10-32 are installed in the store A. Store B is located on the second floor, and the air conditioners 10-33 to 10-64 are installed in the store B. Store C is located on the third floor, and the air conditioners 10-65 to 10-96 are installed in the store C. Store D is located on the fourth floor, and the air conditioners 10-97 to 10-128 are installed in the store D. The air conditioners 10-1 to 10-128 are configured to be workable in an working modes, that is, cooling mode, heating mode, ventilation mode, or dehumidification mode.

Hereinafter, the air conditioners 10-1 to 10-128 will be described as "air conditioners 10" unless it is necessary to specify any of them. Similarly, the tablet terminals 50-1 to 50-3 will be described as "tablet terminals 50" unless it is necessary to specify any of them. Similarly, the access points 40-1 to 40-3 will be described as "access points 40" unless it is necessary to specify any of them.

The controller 20 communicates with the air conditioners 10-1 to 10-128 to transmit working-control information for controlling the working of the air conditioners 10-1 to 10-128 as needed, and acquire working status information of the air conditioners 10-1 to 10-128 at predetermined time intervals. This working status information includes at least information on the working/stopped (ON/OFF) state, set working mode, set temperature, air volume, and wind direction of each air conditioner 10.

Figure 2:
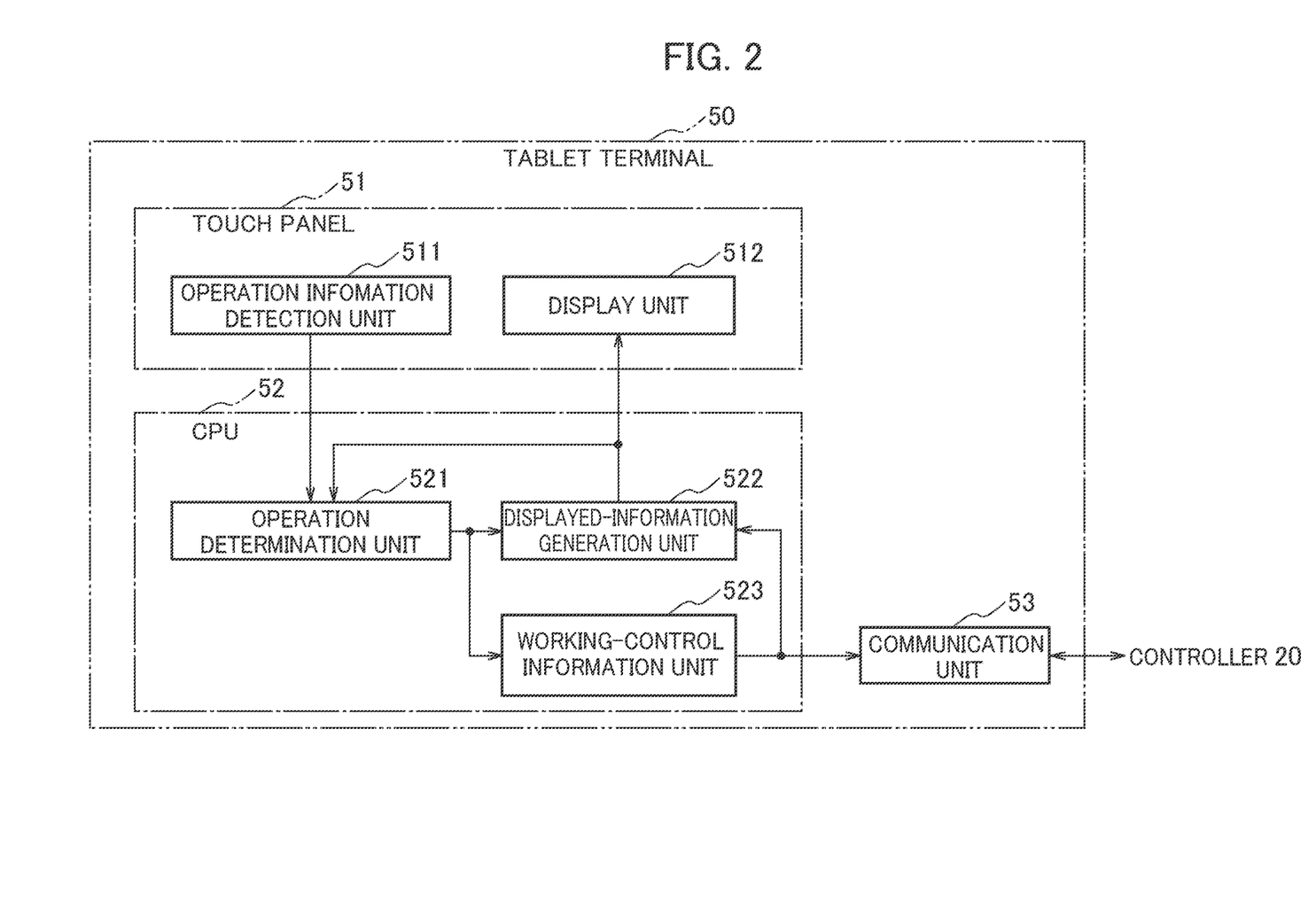
FIG. 2 is a block diagram of a configuration of the tablet terminal as the air conditioner management device according to the embodiment of the present invention.

As illustrated in FIG. 2, each tablet terminal 50 has a touch panel 51, a CPU 52, and a communication unit 53. The touch panel 51 has an operation information detection unit 511 and a display unit 512. The operation information detection unit 511 detects the position of an operation performed by the contact of a manager's finger or the like on the touch panel 51, and the operation type such as tap operation or swipe operation. The display unit 512 displays the display information generated by a displayed-information generation unit 522 described later. The communication unit 53 sequentially performs communication with the controller 20 via the access points 40, issues various instructions regarding operation to the air conditioners 10-1 to 10-128, and acquires the working status information of the air conditioners 10-1 to 10-128 from the controller 20.

The CPU 52 has an operation determination unit 521, a displayed-information generation unit 522, and a working-control information generation unit 523. The operation determination unit 521 determines the content of the operation performed by the manager based on the operation information detected by the operation information detection unit 511 and the display information generated by the displayed-information generation unit 522. That is, the operation determination unit 521 determines the content of the operation from a combination of the content of the display information at the operation position detected by the operation information detection unit 511 and the type of the applied operation, and outputs the corresponding operation information. Examples of the content of the operation include an operation of displaying a summary screen regarding the working status of the air conditioners to be managed, an operation of displaying a control screen for manipulating the operation of a predetermined one of the air conditioners, an operation of changing the content of working of a predetermined one of the air conditioners based on the operation information on the summary screen or control screen. The displayed-information generation unit 522 generates display information to be displayed on the display unit 512, based on the content of the operation determined by the operation determination unit 521 and the working status information of the air conditioners 10-1 to 10-128 acquired from the controller 20. In addition, the displayed-information generation unit 522 updates as appropriate the working status information of the air conditioners 10-1 to 10-128 in the generated display information to the latest information. The working-control information generation unit 523 generates working control information of the air conditioner 10 to be operated based on the content of the operation determined by the operation determination unit 521.

<Operations of Air Conditioning System Using Air Conditioner Management Device According to Embodiment>

Figure 3:
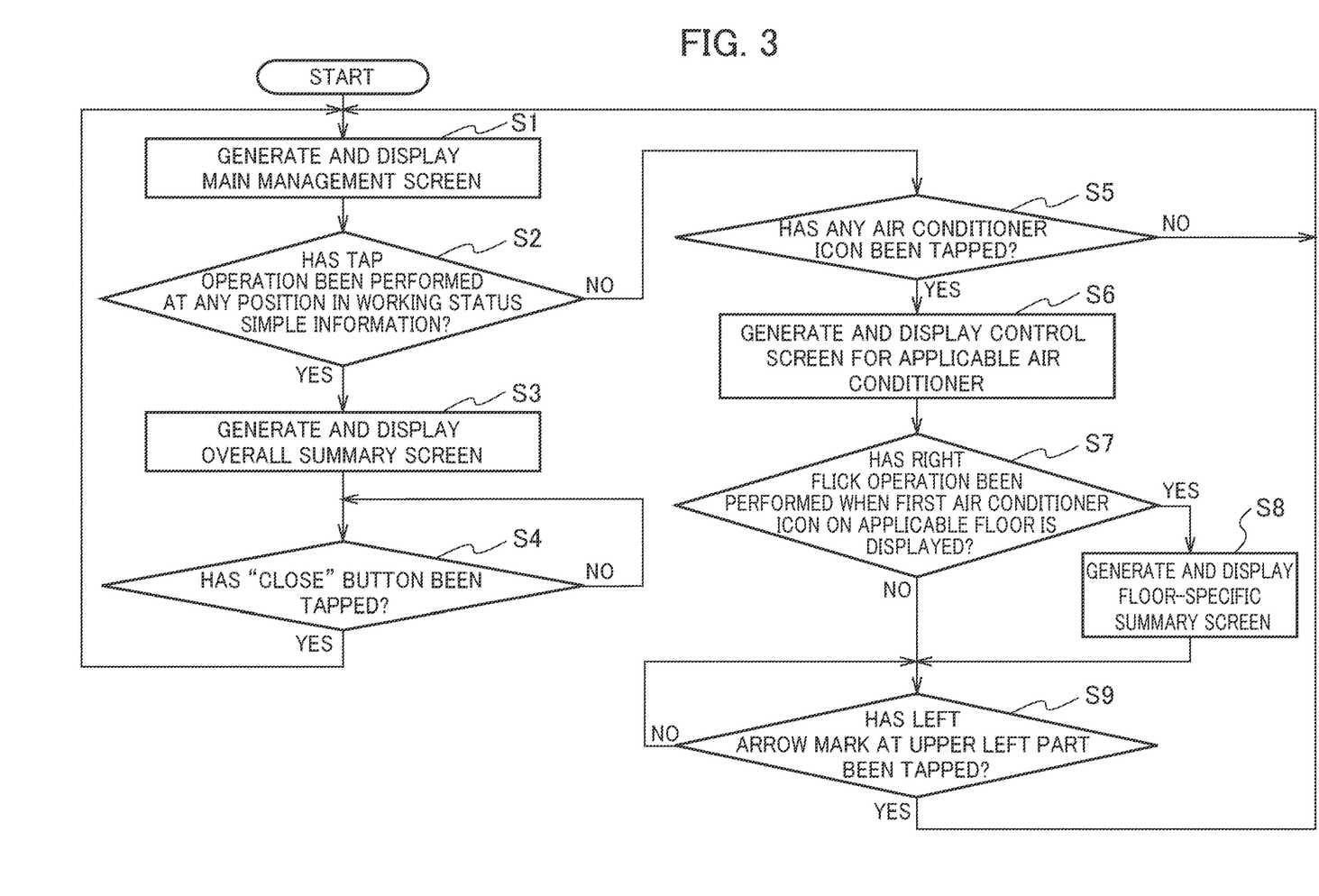
FIG. 3 is a flowchart illustrating operations of the tablet terminal as the air conditioner management device according to the embodiment of the present invention.

Next, the operations of the air conditioning system 1 according to the present embodiment will be described with reference to the flowchart of FIG. 3 and the screen configuration diagrams of FIGS. 4 to 8. In the air conditioning system 1, the controller 20 acquires and holds the working status information of the air conditioners 10-1 to 10-128 at predetermined time intervals.

Figure 4:
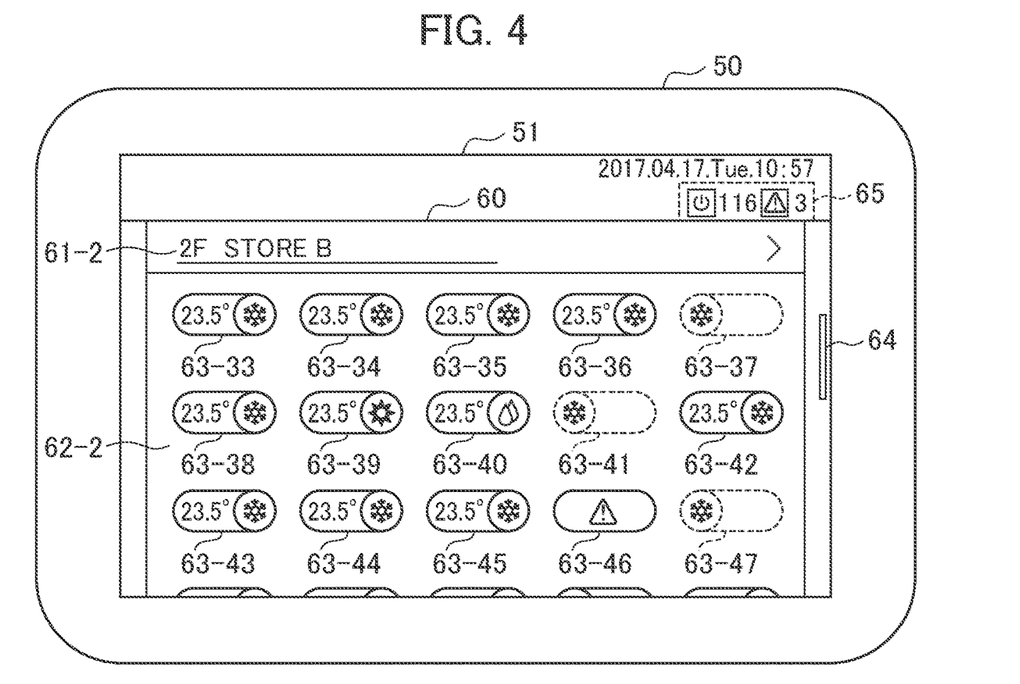
FIG. 4 is an example of a main management screen displayed on the tablet terminal as the air conditioner management device according to the embodiment of the present invention.

When the manager starts the management work of the air conditioners 10-1 to 10-128 using the tablet terminal 50, the displayed-information generation unit 522 acquires the latest working status information of the air conditioners 10-1 to 10-128 from the controller 20, and generates display information to be presented on a main management screen 60 using the acquired information.

The main management screen 60 has area display sections 61-1 to 61-4 and air conditioner icon display sections 62-1 to 62-4 corresponding to the first floor (store A) to the fourth floor (store D), respectively. Text information "first floor (store A)" is located in the area display section 61-1 corresponding to the first floor, and air conditioner icons 63-1 to 63-32 corresponding to the air conditioners 10-1 to 10-32 installed on the first floor are located in the air conditioner icon display section 62-1. Text information "second floor (store B)" is located in the area display section 61-2 corresponding to the second floor, and air conditioner icons 63-33 to 63-64 corresponding to the air conditioners 10-33 to 10-64 installed on the second floor are located in the air conditioner icon display section 62-2. Text information "third floor (store C)" is located in the area display section 61-3 corresponding to the third floor, and air conditioner icons 63-65 to 63-96 corresponding to the air conditioners 10-65 to 10-96 installed on the third floor are located in the air conditioner icon display section 62-3. Text information "fourth floor (store D)" is located in the area display section 61-4 corresponding to the fourth floor, and air conditioner icons 63-97 to 63-128 corresponding to the air conditioners 10-97 to 10-128 installed on the fourth floor are located in the air conditioner icon display section 62-4.

These air conditioner icons 63-1 to 63-128 functions as operation switches for switching ON/OFF of the corresponding air conditioners 10-1 to 10-128. The display information in these area display section and air conditioner icon display section is appropriately changed depending on the number of floors of the building to be managed and the number of air conditioners installed.

The generated display information on the main management screen 60 is sent to and displayed on the display unit 512 of the touch panel 51 (S1). FIG. 4 illustrates an example of the main management screen 60 displayed on the display unit 512. In FIG. 4, since all the information of the main management screen 60 cannot be displayed on the display unit 512, some portions of the area display section 61-2 and the air conditioner icon display section 62-2 in the main management screen 60 are displayed on the display unit 512. Text information "second floor (store B)" is displayed in the area display section 61-2, and the air conditioner icons 63-33 to 63-47 are displayed in the air conditioner icon display section 62-2. Of the display information on the main management screen 60, information that currently does not appear can be displayed by moving the display area in the main management screen 60 with the operation of the scroll bar 64 at the right end of the screen.

These air conditioner icons 63-33 to 63-47 are displayed in different colors or brightness based on the ON/OFF states of the corresponding air conditioners. For example, the air conditioner icons corresponding to the air conditioners in the ON state are displayed in color graphics, and the air conditioner icons corresponding to the air conditioners in the OFF state are displayed in monochrome and low-brightness graphics. In FIG. 4, the air conditioner icons 63-37, 63-41, and 63-47 are displayed in monochrome and low-brightness graphics, indicating that the corresponding air conditioners 10-37, 10-41, 10-47 are in the OFF state. A mark indicating the occurrence of an error is displayed at the display position of the air conditioner icon 63-46, indicating that the corresponding air conditioner 10-46 has caused an error and is in the OFF state. The other air conditioner icons 63-33 to 63-36, 63-38 to 63-40, 63-42 to 63-45 are displayed in color graphics, indicating that the corresponding air conditioners 10-33 to 10-36, 10-38-10-40, and 10-42-10-45 are in the ON state.

In addition, each icon includes a mark indicating the working mode currently set for the corresponding air conditioner. In FIG. 4, the air conditioner icons 63-33 to 63-38, 63-41 to 63-45, and 63-47 contain a mark representing the cooling mode, which indicates that the corresponding air conditioners 10-33 to 10-38, 10-41 to 10-45, and 10-47 are currently set to the cooling mode. The air conditioner icon 63-39 contains a mark indicating the heating mode, which indicates that the corresponding air conditioner 10-39 is currently set to the heating mode. The air conditioner icon 63-40 contains a mark indicating the dehumidification mode, which indicates that the corresponding air conditioner 10-40 is currently set to the dehumidification mode.

The marks contained in the air conditioner icons 63-37, 63-41, and 63-47 corresponding to the air conditioners currently in the OFF state represent the working modes in which the air conditioners have worked most recently. The working mode in which an air conditioner has worked most recently is maintained even in the OFF state, and when the air conditioner in the OFF state is turned on, the working is restarted in the working mode.

Further, in the upper right of the main management screen 60 of FIG. 4, displayed is working status simple information 65 that simply indicates the working status of all the air conditioners in the building X. In FIG. 4, as the working status simple information 65, displayed are a mark and text information "116" indicating the number of the air conditioners in the ON state in the building X and a mark and text information "3" indicating the number of the air conditioners in the error state.

By looking at the main management screen 60, the manager can grasp the ON/OFF states and the currently set working modes of the air conditioners.

While the main management screen 60 is being displayed, the display information is appropriately updated based on the latest information acquired by the displayed-information generation unit 522 from the controller 20 at predetermined time intervals.

On the main management screen 60 displayed in this way, when the manager taps at any position in the display information of the mark and the text information "116" indicating the number of the air conditioners in the ON state in the working status simple information 65 ("YES" in S2), the displayed-information generation unit 522 aggregates the number of working air conditioners in each of the working modes and the number of stopped air conditioners in each of the working modes based on the latest working status information of the air conditioners 10-1 to 10-128. Then, an overall summary screen 70A indicating the detailed working status of the air conditioners in the entire building X is generated and displayed on the display unit 512 (S3).

Figure 5:
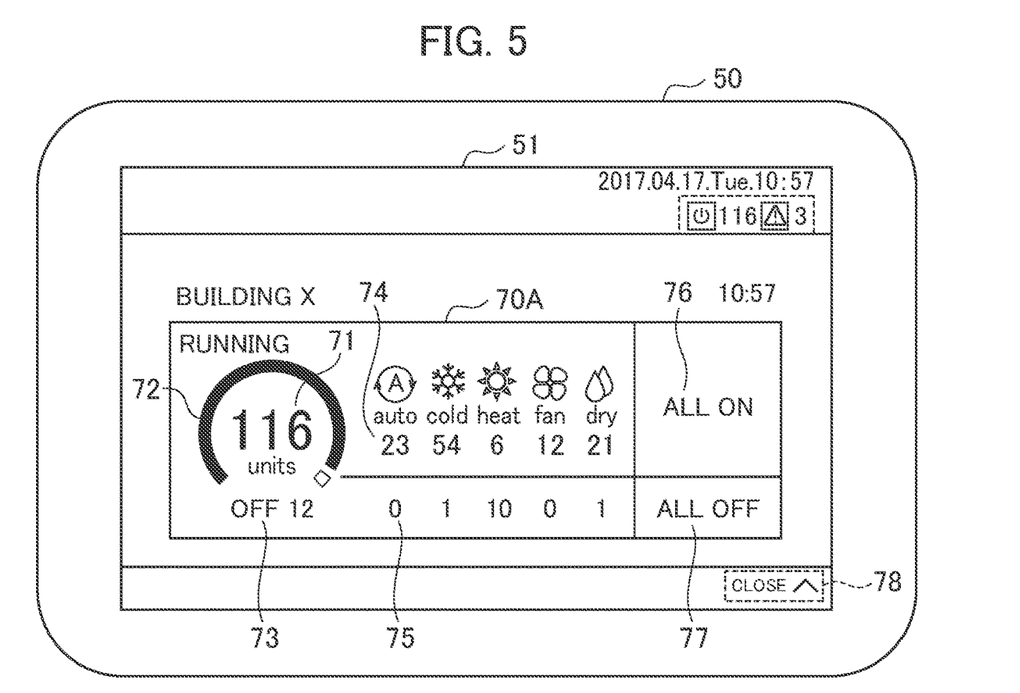
FIG. 5 is an example of a horizontally long overall summary screen displayed on the tablet terminal as the air conditioner management device according to the embodiment of the present invention.

FIG. 5 illustrates an example of the overall summary screen 70A displayed on the display unit 512. The overall summary screen 70A of FIG. 5 is configured in a horizontally long manner, and has at the upper left part, total working unit number information 71 that indicates the number of the air conditioners currently in the ON state in the building X, and graphical information 72 that indicates the proportion of the number of the air conditioners in the ON state to the total number of the air conditioners by the length of an arc. The overall summary screen 70A also has at the lower left part, total stopped unit number information 73 displayed, which indicates the number of the air conditioners currently in the OFF state in the building X.

The overall summary screen 70A further has at the upper central part, graphic icons corresponding to the respective working modes (automatic working mode, cooling mode, heating mode, ventilation mode, and dehumidification mode) displayed in a horizontal row, and under the corresponding icons (working mode icons), has mode-specific working unit number information 74 displayed, indicating the number of the air conditioners currently in the ON state in the set working modes of all the air conditioners in the building X, and further under the mode-specific working unit number information 74, has mode-specific stopped unit number information 75 displayed, indicating the number of the air conditioners currently in the OFF state in the set working modes of all the air conditioners in the building X. That is, the working mode icons, the mode-specific working unit number information 74, and the mode-specific stopped unit number information 75 are arranged at positions vertically corresponding to the working modes.

The overall summary screen 70A has "ALL ON" button information 76 displayed at the upper right part, which is first information for performing an operation to turn all the air conditioners in the building X into the ON state. The "ALL ON" button information 76 includes a square frame and the characters "ALL ON" arranged in almost the center of the frame. The overall summary screen 70A has "ALL OFF" button information 77 displayed at the lower right part, which is second information for performing an operation to turn all the air conditioners in the building X into the OFF state. The "ALL OFF" button information 77 includes a square frame and the characters "ALL OFF" arranged in almost the center of the frame.

The "ALL ON" button information 76 is displayed at a position corresponding to the total working unit number information 71 and the mode-specific working unit number information 74 which are information on the number of the air conditioners in the ON state, for example, in FIG. 5, on the right side of the information on the number of the air conditioners in the ON state. The "ALL OFF" button information 77 is displayed at a position corresponding to the total stopped unit number information 73 and the mode-specific stopped unit number information 75 which are information on the number of the air conditioners in the OFF state, for example, in FIG. 5, on the right side of the information on the number of the air conditioners in the OFF state. That is, the "ALL ON" button information 76 and the "ALL OFF" button information 77 are arranged at vertically corresponding positions. This display makes it easier for the manager to recognize the functions of the "ALL ON" button information 76 and the "ALL OFF" button information 77.

Since the "ALL ON" button information 76 is set to the height (length) covering both the working mode icons and the mode-specific working unit number information 74, the "ALL ON" button information 76 is longer heightwise than the "ALL OFF" button information 77. Therefore, the "ALL ON" button information 76 and the "ALL OFF" button information 77 have the same width, but the quadrangular frame of the "ALL ON" button information 76 has the shape of an almost square, and the quadrangular frame of the "ALL OFF" button information 77 has the shape of a horizontally long rectangle.

When the manager taps at the position of the "ALL ON" button information 76, the working-control information generation unit 523 generates ON control information for switching the air conditioners in the OFF state to the ON state in the currently set working modes, and transmits the ON control information to the corresponding air conditioners 10 via the controller 20. The air conditioners 10 for which the ON control information has been acquired are switched from the OFF state to the ON state in the currently set working modes. No instruction is given to the air conditioners 10 that are already in the ON state, and these air conditioners 10 remain in the ON state. When the manager taps at the position of the "ALL ON" button information 76, the displayed-information generation unit 522 updates the information 71 to 75 displayed in the overall summary screen 70A. Specifically, the displayed-information generation unit 522 updates the information such that the values of the corresponding working modes in the mode-specific working unit number information 74 increase by the number of the air conditioners 10 that have been switched to the ON state by this operation. The displayed-information generation unit 522 also updates the information such that the values of all the working modes in the mode-specific stopped unit number information 75 become "0".

On the other hand, when the manager taps at the position of the "ALL OFF" button information 77, the working-control information generation unit 523 generates OFF control information for switching the air conditioners in the ON state to the OFF state, and transmits the OFF control information to the corresponding air conditioners 10 via the controller 20. The air conditioners 10 for which the OFF control information has been acquired are switched from the ON state to the OFF state. No instruction is given to the air conditioners 10 that are already in the OFF state, and these air conditioners 10 remain in the OFF state.

When the manager taps at the position of the "ALL OFF" button information 77, the displayed-information generation unit 522 updates the information 71 to 75 displayed in the overall summary screen 70A. Specifically, the displayed-information generation unit 522 also updates the information such that the values of all the working modes in the mode-specific working unit number information 74 become "0". In addition, the displayed-information generation unit 522 updates the information such that the values of the corresponding working modes (the working modes immediately before turning to the OFF state) in the mode-specific stopped unit number information 75 increase by the number of the air conditioners 10 that have been switched to the OFF state by this operation.

While the overall summary screen 70A is displayed, the displayed-information generation unit 522 appropriately aggregates the number of working units and the number of stopped units in each of the working modes based on the latest information acquired from the controller 20 at predetermined time intervals, and updates the display information.

The overall summary screen 70A also has "CLOSE" button information 78 displayed at the lower right part, and when the manager taps at the position of the "CLOSE" button information 78 ("YES" in S4), the touch panel 51 returns to the state in which the main management screen 60 of FIG. 4 is displayed.

When the manager taps one of the air conditioner icons, for example, the air conditioner icon 63-35 on the main management screen 60 of FIG. 4 ("NO" in S2 to "YES" in S5), the displayed-information generation unit 522 generates a control screen 80-35 for operating the detailed working contents of the corresponding air conditioner 10-35 and displays the same on the display unit 512 (S6).

Figure 6:
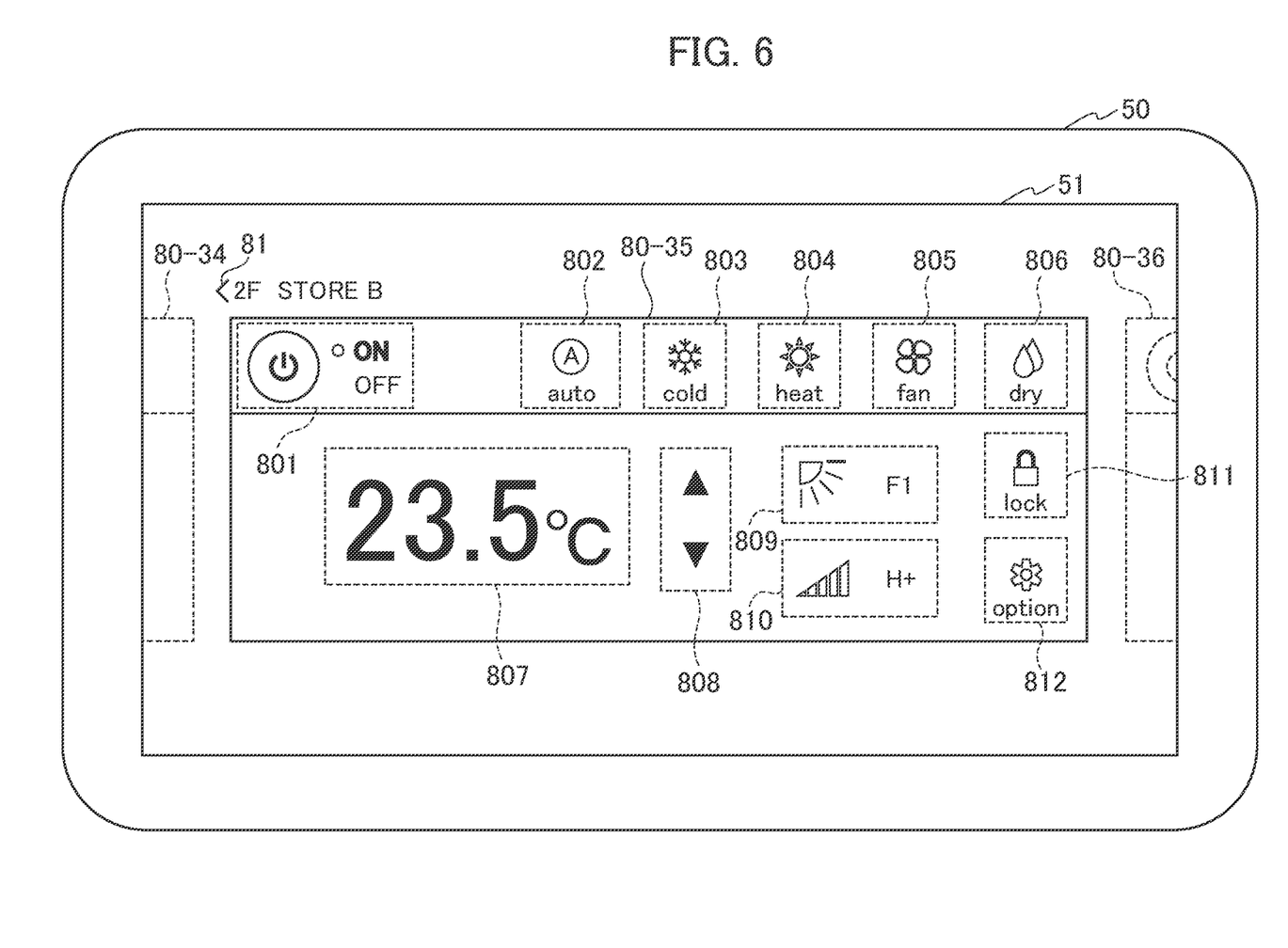
FIG. 6 is an example of a control screen displayed on the tablet terminal as the air conditioner management device according to the embodiment of the present invention.

FIG. 6 illustrates an example of the control screen 80-35 displayed on the display unit 512. The control screen 80-35 of FIG. 6 is horizontally long, and has displayed start/stop (ON/OFF) button information 801, automatic working mode button information 802, cooling mode button information 803, heating mode button information 804, ventilation mode button information 805, dehumidification mode button information 806, set temperature information 807, set temperature change button information 808, wind direction change button information 809, air volume change button information 810, lock button information 811, and option button information 812.

With these pieces of information displayed, when the manager performs a touch operation at the position of any button information on the control screen 80-35, the operation information detection unit 511 detects the operation information. Then, the operation determination unit 521 determines the content of the operation performed by the manager based on the operation information detected by the operation information detection unit 511 and the display information generated by the displayed-information generation unit 522. When the operation determination unit 521 determines the content of the operation, the working-control information generation unit 523 generates working control information of the air conditioner 10-35 to be operated, based on the determined content of the operation. The generated working control information is transmitted to the corresponding air conditioner 10-35 via the communication unit 53 and the controller 20, and the content of the working is changed.

In other words, by operating these buttons, the manager can turn ON/OFF a predetermined air conditioner, change the working mode, change the set temperature, change the wind direction, change the air volume, prohibit the acceptance of operations, set optional functions, and the like.

In addition, when the operation determination unit 521 determines the content of the operation, the displayed-information generation unit 522 changes the corresponding button information in the control screen 80-35 based on the determined content of the operation.

In FIG. 6, on the left side of the control screen 80-35, displayed is a part of a control screen 80-34 for performing the detailed contents of working of the air conditioner 10-34. When the manager performs a flick operation to the right on the touch panel 51, the control screen 80-34 moves to the center of the touch panel 51. In addition, on the right side of the control screen 80-35, displayed is a part of a control screen 80-36 for performing the detailed contents of working of the air conditioner 10-36. When the manager performs a flick operation to the left on the touch panel 51, the control screen 80-36 moves to the center of the touch panel 51.

Figure 7:
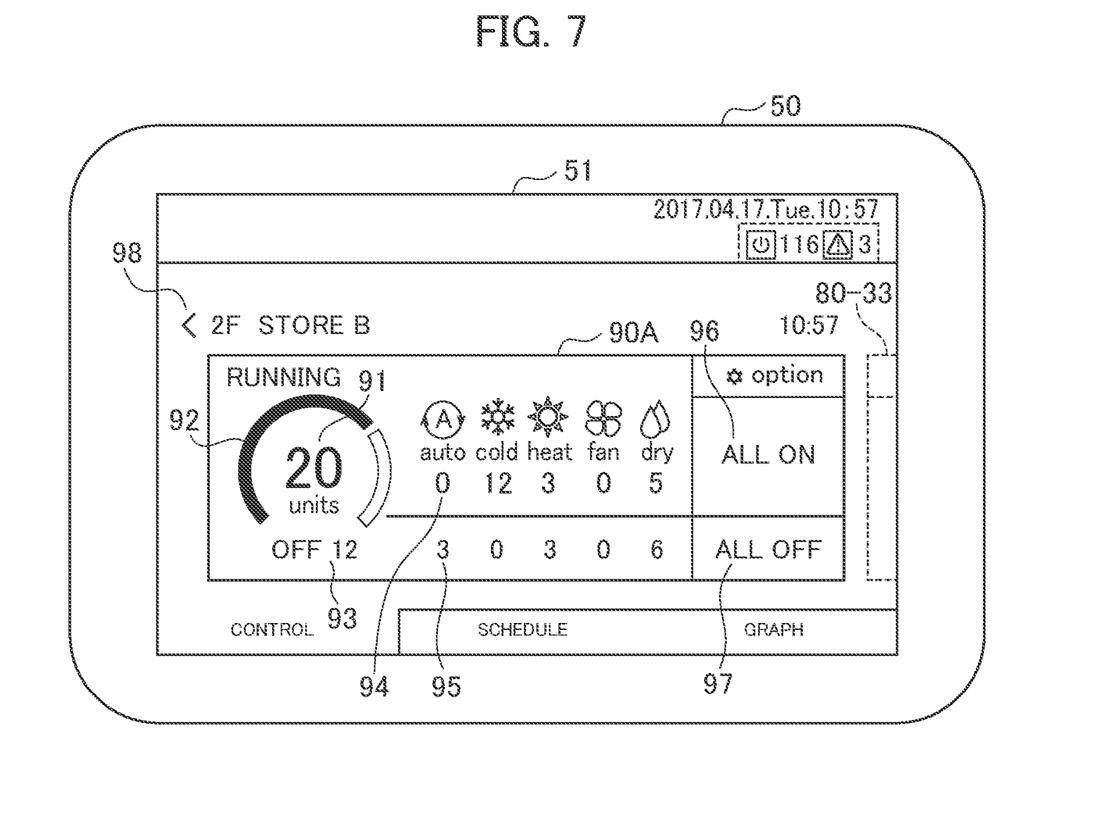
FIG. 7 is an example of a horizontally long summary screen for each floor displayed on the tablet terminal as the air conditioner management device according to the embodiment of the present invention.

Also, by repeating the flick operation to the right, when the flick operation to the right is further performed ("YES" in S7) while the first air conditioner 10-33 among the air conditioners on the second floor currently being operated is displayed in the center, the displayed-information generation unit 522 generates a floor-specific summary screen 90A representing the detailed working status of the air conditioners 10-33 to 10-64 on the second floor, and displays the same on the display unit 512 (S8).

FIG. 7 illustrates an example of the floor-specific summary screen 90A displayed on the display unit 512. The floor-specific summary screen 90A of FIG. 7 is configured horizontally, and has at the upper left part, total working unit number information 91 that indicates the number of the air conditioners currently in the ON state on the second floor, and graphical information 92 that indicates the proportion of the number of the air conditioners in the ON state to the total number of the air conditioners on the second floor by the length of an arc, displayed. The floor-specific summary screen 90A also has at the lower left part, total stopped unit number information 93 displayed, which indicates the number of the air conditioners in the OFF state on the second floor.

The floor-specific summary screen 90A also has in the upper central part, mode-specific working unit number information 94 displayed, which indicates the number of the air conditioners on the second floor currently in the ON state in each of the working modes (the automatic working mode, cooling mode, heating mode, ventilation mode, and dehumidification mode), and has in the lower central part, mode-specific stopped unit number information 95 displayed, which indicates the number of the air conditioners currently in the OFF state in each of the working modes.

The floor-specific summary screen 90A has at the upper right part, "ALL ON" button information 96 displayed, for performing an operation to turn all the air conditioners on the second floor into the ON state. The floor-specific summary screen has at the lower right part, "ALL OFF" button information 97 for performing an operation to turn all the air conditioners on the second floor into the OFF state.

In FIG. 7, on the right side of the floor-specific summary screen 90A, displayed is a part of a control screen 80-33. When the manager performs a flick operation to the left on the touch panel 51, the control screen 80-33 moves to the center of the touch panel 51.

A leftward arrow mark 81 is displayed at the upper left part of the control screen of FIG. 6. When the manager taps the leftward arrow mark 81, the touch panel 51 returns to the state in which the main management screen 60 of FIG. 4 is displayed (S9). In addition, a leftward arrow mark 98 is displayed at the upper left part of the floor-specific summary screen 90A of FIG. 7. When the manager taps the leftward arrow mark 98, the touch panel 51 similarly returns to the state in which the main management screen of FIG. 4 is displayed (S9).

According to the above embodiment, even when a large number of air conditioners is to be managed, it is possible to easily display screens for grasping the working status of all the air conditioners. Specifically, for a large number of air conditioners to be managed, a summary screen including the number of the air conditioners in the ON state in each of the working modes and the number of the air conditioners in the OFF state in each of the working modes can be displayed.

By displaying such a summary screen, for example, if any air conditioner is working in the heating mode or is stopped in the setting of the heating mode when all the air conditioners should be set to the cooling mode in midsummer, the manager can easily notice this condition and change the setting. In particular, even if the number of air conditioners to be managed is large and all the air conditioner icons cannot be displayed at the same time as illustrated in FIG. 4, the manager can easily recognize the working status of all the air conditioners without performing a scroll operation or the like.

Figure 8:
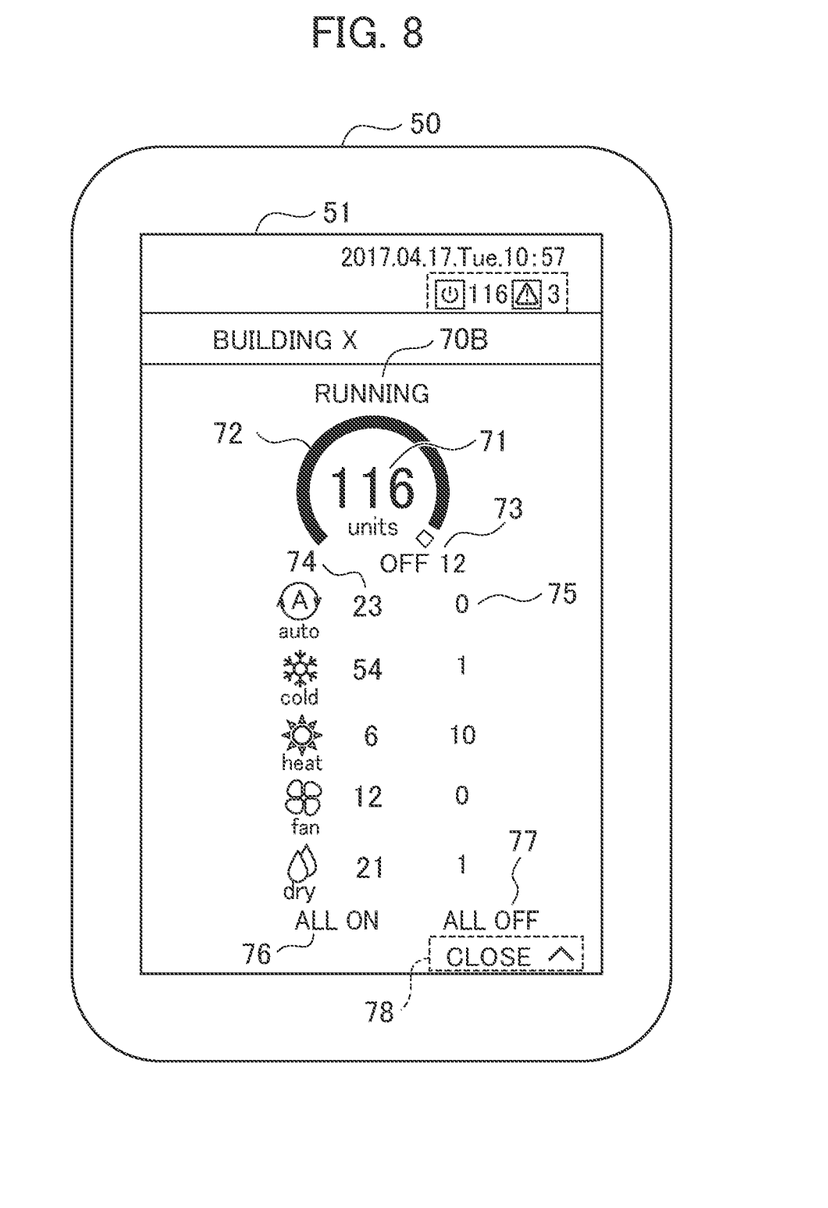
FIG. 8 is an example of a vertically long overall summary screen displayed on the tablet terminal as the air conditioner management device according to the embodiment of the present invention.

In the above-described embodiment, the overall summary screen 70A and the floor-specific summary screen 90A are configured to be horizontally long, but they may be configured to be vertically long instead. FIG. 8 illustrates an example of a vertically long overall summary screen 70B.

The overall summary screen 70B has at the upper left part, total working unit number information 71 displayed, which indicates the number of the air conditioners currently in the ON state in the building X, and graphical information 72 displayed, which indicates the proportion of the number of the air conditioners in the ON state to the total number of the air conditioners by the length of an arc, and has thereunder total stopped unit number information 73 displayed, which indicates the number of the air conditioners in the OFF state in the building X.

The overall summary screen 70B also has in the central left part, mode-specific working unit number information 74 displayed, which indicates the number of the air conditioners currently in the ON state in each of the working modes (the automatic working mode, cooling mode, heating mode, ventilation mode, and dehumidification mode) of all the air conditioners in the building X, and has in the central right part, mode-specific stopped unit number information 75 displayed, which indicates the number of the air conditioners currently in the OFF state in each of the working modes of all the air conditioners in the building X.

The overall summary screen 70B also has at the lower left side "ALL ON" button information 76 displayed, for performing an operation of turning all the air conditioners in the building X into the ON state and has in the lower right side "ALL OFF" button information 77 displayed, for performing an operation of turning all the air conditioners in the building X into the OFF state. That is, the "ALL ON" button information 76 is displayed at a position corresponding to the mode-specific working unit number information 74 that is information on the number of the air conditioners in the ON state, and the "ALL OFF" button information 77 is displayed at a position corresponding to the mode-specific stopped unit number information 75 that is information on the number of the air conditioners in the OFF state. The overall summary screen 70B also has "CLOSE" button information 78 displayed at the lower right part, and when the manager taps at the position of the "CLOSE" button information 78 ("YES" in S4), the touch panel 51 returns to the state in which the main management screen 60 of FIG. 4 is displayed. Similarly, the floor-specific summary screen may be configured to be vertically long. In this way, configuring the screens by arranging each of information such that the information indicating the working or stopped states of the air conditioners and the button information for performing ON or OFF operation on all the air conditioners are arranged in pairs, allows the user to grasp the working status of the air conditioners and comprehend the contents of operations of the air conditioners, thereby to reduce the risks of erroneous operations and false recognition of working states of the air conditioners.

In the present embodiment, one air conditioner is associated with one air conditioner icon. However, the present invention is not limited to this, and a plurality of air conditioners may be associated with one air conditioner icon. When a plurality of air conditioners is associated with one air conditioner icon, the working of the corresponding plurality of air conditioners can be collectively controlled by operating the air conditioner icon.

Normally, when the air conditioner 10 is in the OFF state, the working mode cannot be changed from the remote controller (not illustrated) supplied to the air conditioner 10, and during in the OFF state, the air conditioner 10 is maintained in the working mode in which the air conditioner 10 has worked (been ON) most recently. That is, the working mode can be changed from the remote controller only when the air conditioner 10 is in the ON state.

To handle this, the working mode of the air conditioner 10 in the OFF state may be changeable using the main management screen 60 or the control screen 80, from the tablet terminal 50 used in the present embodiment. In this case, when an operation of changing the working mode of the air conditioner 10 is performed on the control screen related to the air conditioner 10 in the OFF state, the working mode set to the air conditioner 10 is changed using the working control information generated by the working-control information generation unit 523 in response to the operation. Specifically, the working mode set to the air conditioner 10 in the OFF state is the working mode in which it has worked most recently, or the latest working mode changed by the operation on the tablet terminal 50 after turning to the OFF state. Then, when the air conditioner 10 is next switched to the ON state, the air conditioner starts to work in the set working mode.

In the above embodiment, the tablet terminal 50 has been described as an air conditioner management device. Alternatively, the controller 20 may be provided with a touch panel, and the various functions described in relation to the tablet terminal 50 described above may be incorporated into the controller 20 so that the controller 20 can be both the central management device and the air conditioner management device.

Although the embodiment of the present invention has been described above, this embodiment is presented as an example and is not intended to limit the scope of the invention. This novel embodiment can be implemented in various other embodiments, and various omissions, replacements, and changes can be made without departing from the gist of the invention. This embodiment and its modifications are included in the scope and gist of the invention, and are also included in the scope of the invention described in the claims and the equivalent scope thereof.

The invention claimed is:

1. An air conditioner management device that has a plurality of air conditioners as management targets, wherein the plurality of air conditioners have a plurality of working modes configured to be workable in at least cooling mode and heating mode, and wherein the air conditioner management device comprises:
a controller configured to:
generate, as for the plurality of air conditioners, display information on a summary screen including mode-specific working unit number information displaying a total number of air conditioners currently in an ON state in each of the plurality of working modes that have been set and mode-specific stopped unit number information displaying the total number of air conditioners currently in an OFF state in each of the plurality of working modes that have been set,
generate the summary screen further including first information for performing an operation of turning all the plurality of air conditioners arranged at positions corresponding to the mode-specific working unit number information into the ON state and second information for performing an operation of turning all the plurality of air conditioners arranged at positions corresponding to the mode-specific stopped unit number information into the OFF state, and
generate the summary screen such that the mode-specific working unit number information and the mode-specific stopped unit number information are aligned and arranged at vertically corresponding positions, the first information is arranged on a right side of the mode-specific working unit number information, and the second information is arranged on a right side of the mode-specific stopped unit number information; and
a display screen configured to display the display information generated by the controller, the display screen comprising a touch panel configured to display the display information generated by the controller and configured to detect a touch operation performed at any position in the display information displayed, wherein:
the controller is configured to generate the ON control information for switching all the plurality of air conditioners to the ON state when a touch operation on first information is detected, and generate the OFF control information for switching all the plurality of air conditioners to the OFF state when a touch operation on second information is detected.

2. The air conditioner management device according to claim 1, wherein a working mode set to the plurality of air conditioners in the OFF state is the working mode in which the plurality of air conditioners have worked most recently, or the working mode changed after the plurality of air conditioners have turned into the OFF state.

3. The air conditioner management device according to claim 1, wherein,
the controller is configured to increment values of working modes applicable in the mode-specific working unit number information by the total number of air conditioners switched to the ON state by the operation, and updates values of all the working modes in the mode-specific stopped unit number information to "0", responsive to when a touch operation is performed at a position of the first information on the summary screen displayed on the display screen, and
the controller is configured to turn the values of all the working modes in the mode-specific working unit number information to "0" and updates the values of the working modes applicable in the mode-specific stopped unit number information to increase by the total number of air conditioners switched to the OFF state by the operation, responsive to when a touch operation is performed at a position of the second information on the summary screen displayed on the display screen.

4. The air conditioner management device according to claim 3,
wherein the controller is configured to generate the summary screen such that the first information and the second information are aligned and arranged at vertically corresponding positions.

5. The air conditioner management device according to claim 2, wherein the controller is configured to increment values of working modes applicable in the mode-specific working unit number information by the total number of air conditioners switched to the ON state by the operation, and update values of all the working modes in the mode-specific stopped unit number information to "0", responsive to when a touch operation is performed at a position of the first information on the summary screen displayed on the display screen, and the controller is configured to turn the values of all the working modes in the mode-specific working unit number information to "0" and update the values of the working modes applicable in the mode-specific stopped unit number information to increase by the total number of air conditioners switched to the OFF state by the operation, responsive to when a touch operation is performed at a position of the second information on the summary screen displayed on the display screen.

* * * * *